(12) United States Patent
Whitney et al.

(10) Patent No.: US 8,538,644 B2
(45) Date of Patent: Sep. 17, 2013

(54) DRIVER TORQUE REQUEST SYSTEMS AND METHODS

(75) Inventors: Christopher E. Whitney, Highland, MI (US); Robert C. Simon, Jr., Brighton, MI (US); William L. Aldrich, III, Davisburg, MI (US); Jun Lu, Novi, MI (US); Birendra P. Bhattarai, Novi, MI (US); Adam J Heisel, Garden City, MI (US); Ning Jin, Novi, MI (US)

(73) Assignee: GM Global Technology Operations LLC

( * ) Notice: Subject to any disclaimer, the term of this patent is extended or adjusted under 35 U.S.C. 154(b) by 517 days.

(21) Appl. No.: 12/763,532

(22) Filed: Apr. 20, 2010

(65) Prior Publication Data

US 2011/0257854 A1    Oct. 20, 2011

(51) Int. Cl.
*G06F 7/00* (2006.01)
*G06F 17/00* (2006.01)
*G06F 19/00* (2011.01)
*B60T 7/12* (2006.01)
*G05D 1/00* (2006.01)
*G06G 7/70* (2006.01)
*F02P 5/00* (2006.01)
*F02M 51/00* (2006.01)

(52) U.S. Cl.
USPC ............... 701/54; 701/84; 701/102; 701/110; 123/406.23; 123/406.46; 123/406.5; 123/406.51; 123/492

(58) Field of Classification Search
USPC .............. 701/54, 84, 102, 110; 123/406.23, 123/406.46, 406.5, 406.51, 492
See application file for complete search history.

(56) References Cited

U.S. PATENT DOCUMENTS

| | | | |
|---|---|---|---|
| 7,698,049 B2* | 4/2010 | Whitney et al. | 701/103 |
| 8,157,035 B2* | 4/2012 | Whitney et al. | 180/65.265 |
| 8,209,102 B2* | 6/2012 | Wang et al. | 701/84 |
| 2009/0021203 A1* | 1/2009 | Claeys et al. | 318/452 |
| 2009/0173314 A1* | 7/2009 | Whitney et al. | 123/350 |
| 2009/0204280 A1* | 8/2009 | Simon et al. | 701/22 |
| 2009/0276137 A1* | 11/2009 | Whitney et al. | 701/101 |
| 2010/0038158 A1* | 2/2010 | Whitney et al. | 180/65.265 |
| 2010/0217472 A1* | 8/2010 | Stempnik et al. | 701/29 |
| 2011/0066344 A1* | 3/2011 | Niwa et al. | 701/70 |
| 2011/0139117 A1* | 6/2011 | Kar et al. | 123/395 |

* cited by examiner

*Primary Examiner* — Asfand Sheikh (57) ABSTRACT

A minimum torque module selectively determines a first minimum propulsion torque based on second and third minimum propulsion torques when a torque converter clutch is in unlocked and locked states, respectively. A zero pedal torque module selectively sets a zero pedal torque equal to the first minimum propulsion torque. A pedal request module determines a pedal torque request based on an accelerator pedal position, a vehicle speed, and the zero pedal torque. A driver request module determines a driver axle torque request based on the pedal torque request. A shaping module selectively shapes the driver axle torque request into a shaped driver axle torque request. A conversion module converts the first minimum propulsion torque into a minimum axle torque. A final driver request module sets a final driver axle torque request equal to a greater of the shaped driver axle torque request and the minimum axle torque.

20 Claims, 7 Drawing Sheets

FIG. 5C

DRIVER TORQUE REQUEST SYSTEMS AND METHODS

FIELD

The present disclosure relates to internal combustion engines and more particularly to driver torque requests.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired predicted torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

A minimum torque module selectively determines a first minimum propulsion torque based on second and third minimum propulsion torques when a torque converter clutch is in unlocked and locked states, respectively. A zero pedal torque module selectively sets a zero pedal torque equal to the first minimum propulsion torque. A pedal request module determines a pedal torque request based on an accelerator pedal position, a vehicle speed, and the zero pedal torque. A driver request module determines a driver axle torque request based on the pedal torque request. A shaping module selectively shapes the driver axle torque request into a shaped driver axle torque request. A conversion module converts the first minimum propulsion torque into a minimum axle torque. A final driver request module sets a final driver axle torque request equal to a greater of the shaped driver axle torque request and the minimum axle torque.

An engine control method comprising: selectively determining a first minimum propulsion torque based on second and third minimum propulsion torques when a torque converter clutch is in unlocked and locked states, respectively; selectively setting a zero pedal torque equal to the first minimum propulsion torque; determining a pedal torque request based on an accelerator pedal position, a vehicle speed, and the zero pedal torque; determining a driver axle torque request based on the pedal torque request; selectively shaping the driver axle torque request; determining a shaped driver axle torque request based on the driver axle torque request; converting the first minimum propulsion torque into a minimum axle torque; and setting a final driver axle torque request equal to a greater one of the shaped driver axle torque request and the minimum axle torque.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A control module of a vehicle may control torque output of an engine based on a final driver axle torque request. The final driver axle torque request is in an axle torque domain, which means that the final driver axle torque request refers to torque at one or more wheels or axles of the vehicle. The final driver axle torque request may be determined using one or more calculations, conversions, limitations, selections, and/or other suitable computations.

For example only, a pedal torque request may be determined based on an accelerator pedal position, a zero pedal torque, and other parameters. In contrast with the final driver axle torque request, the pedal torque request is in a propulsion torque domain. The pedal torque request may be converted into the axle torque domain, arbitrated with driver torque requests, and shaped into the final driver axle torque request.

The control module of the present disclosure limits the final driver axle torque request to a minimum drivability axle torque. The control module may vary the minimum drivability axle torque to prevent an engine stall and to decrease fuel consumption. Limiting the final driver axle torque request to the minimum drivability axle torque may prevent an engine stall by ensuring that there is enough torque carrying capacity available in the transmission to drive rotation of the engine. Limiting the final driver axle torque request to the minimum drivability axle torque may decrease fuel consumption by allowing the control module to enter deceleration fuel cutoff (DFCO) at an earliest time. Limiting the final driver axle torque request to the minimum drivability axle torque may additionally or alternatively decrease fuel consumption by allowing the control module perform regenerative braking at an earliest time.

Figure 1:
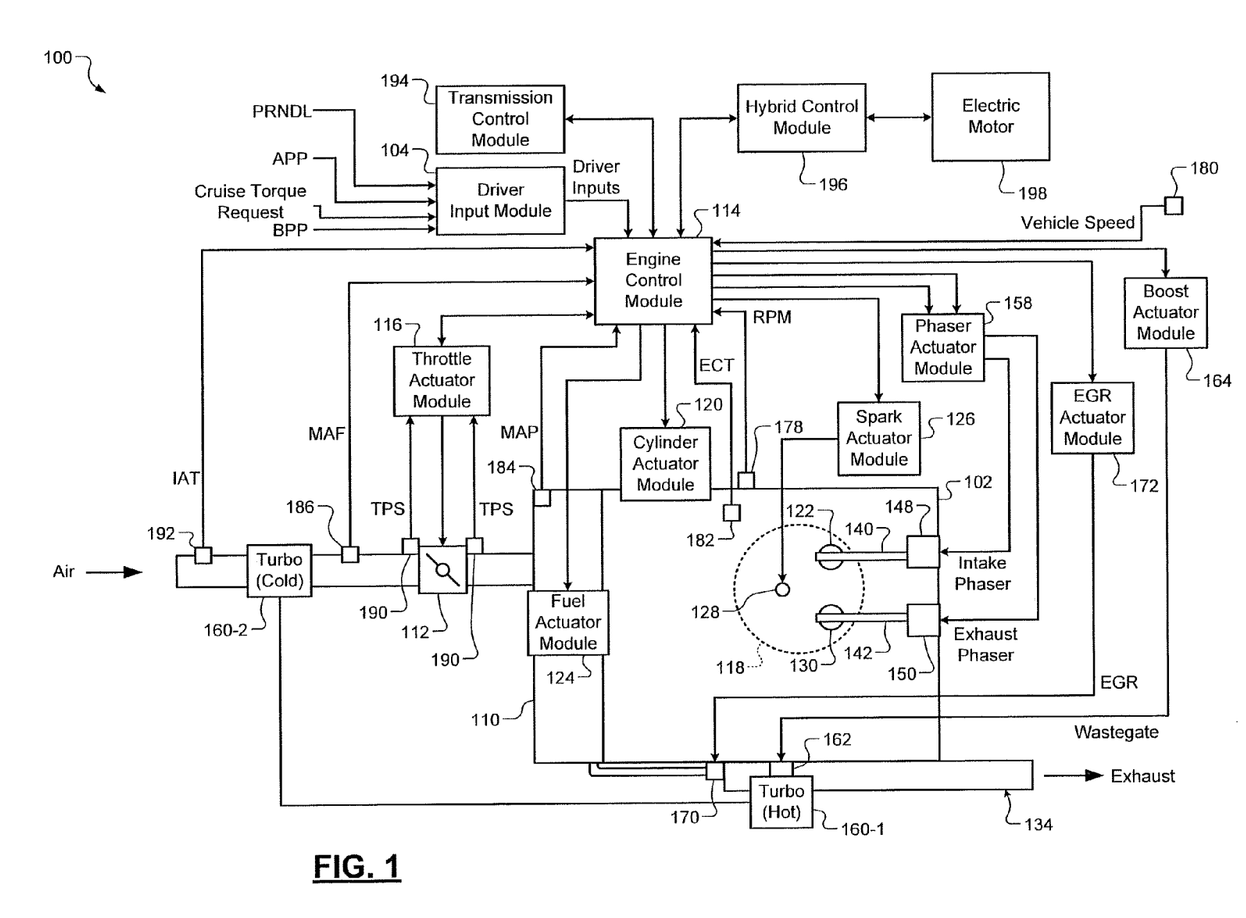
FIG. 1 is a functional block diagram of an exemplary implementation of an engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on driver inputs from a driver input module 104. The driver inputs may include, for example, one or more accelerator pedal positions (APPs) measured by APP sensors (not shown), one or more brake pedal positions (BPPs) measured by BPP sensors (not shown), and a cruise torque request provided by a cruise control system (not shown). In various implementations, the cruise control system may include an adaptive cruise control system that maintains a predetermined following distance. The driver inputs may also include a position of a park, reverse, neutral, drive lever (PRNDL) and other suitable inputs.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into one or more cylinders of the engine 102. While the engine 102 may include more than one cylinder, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some or all of the cylinders, which may improve fuel efficiency in some circumstances.

The engine 102 may operate using a four-stroke engine cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions may be necessary for the cylinder 118 to experience all four of the strokes of one engine cycle.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve(s) of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at a topmost position, referred to as top dead center (TDC).

The spark actuator module 126 may be controlled by a timing signal specifying how far before or after TDC to generate the spark. Because the piston position is directly related to crankshaft rotation, operation of the spark actuator module 126 may be synchronized with crankshaft angle. In various implementations, the spark actuator module 126 may halt provision of spark to deactivated cylinders.

Combustion of the air/fuel mixture within a cylinder may be referred to as a firing event. The spark actuator module 126 may have the ability to vary the timing of the spark for each firing event. In addition, the spark actuator module 126 may have the ability to vary the spark timing for a given firing event even when a change in the timing signal is received after a firing event of a cylinder immediately before a given firing event.

During the combustion stroke, the combustion of the air/fuel mixture drives the piston away from the TDC position, thereby driving the rotation of the crankshaft. The combustion stroke may be defined as the time between the piston reaching TDC and the time at which the piston reaches a bottommost position, which may be referred to as bottom dead center (BDC). During the exhaust stroke, the piston moves toward the TDC position again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may disable opening of the intake valve 122 and/or the exhaust valve 130 of deactivated cylinders. In various other implementations, the intake valve 122 and/or the exhaust valve 130 may be controlled by devices other than camshafts, such as electromagnetic actuators.

The time at which the intake valve 122 is opened may be varied with respect to the TDC position by an intake cam phaser 148. The time at which the exhaust valve 130 is opened may be varied with respect to the TDC position by an exhaust cam phaser 150. A phaser actuator module 158 may control the intake cam phaser 148 and the exhaust cam phaser 150 based on signals from the ECM 114. When implemented, variable valve actuation (VVA) technologies (not shown) may also be controlled by the phaser actuator module 158.

The engine system 100 may include a boost device that provides pressurized air to the intake manifold 110. For example, FIG. 1 shows a turbocharger including a turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver compressed air to the intake manifold 110.

A wastegate 162 (e.g., a turbo bypass valve) may allow exhaust to bypass the turbine 160-1, thereby reducing the boost provided by the turbocharger. The boost may include, for example, the difference between pressure within the intake manifold 110 and pressure within an intake manifold of a naturally aspirated engine under the same operating conditions.

The ECM 114 may control the boost of the turbocharger via a boost actuator module 164. For example only, the boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other near the location of the turbine 160-1, placing intake air in close proximity to hot exhaust.

The engine system 100 may include an exhaust gas recirculation (EGR) valve 170 that selectively directs exhaust gas back to the intake manifold 110. The EGR valve 170 may be located upstream of the turbine 160-1. The EGR valve 170 may be controlled by an EGR actuator module 172.

The engine system 100 may measure rotational speed of the crankshaft in revolutions per minute (RPM) using an RPM sensor 178. The rotational speed of the crankshaft (i.e., the RPM) may also be referred to as the engine speed or the engine output speed.

The engine system 100 may measure speed of the vehicle using a vehicle speed sensor 180. The vehicle speed may be determined based on, for example, a transmission output shaft speed (TOSS), one or more wheel speeds, or another suitable measure of the vehicle speed. Temperature of engine coolant may be measured using an engine coolant temperature (ECT) sensor 182. The ECT sensor 182 may be located within the engine 102 or at other locations where the coolant is circulated, such as a radiator (not shown).

Pressure within the intake manifold 110 may be measured using a manifold absolute pressure (MAP) sensor 184. In various implementations, engine vacuum may be measured, where engine vacuum includes a difference between ambient air pressure and the pressure within the intake manifold 110. Mass air flowrate into the intake manifold 110 may be measured using a mass air flowrate (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The temperature of air being drawn into the engine 102 may be measured using an intake air temperature (IAT) sensor 192. In various implementations, the IAT may be used as an ambient air temperature. The ECM 114 may use signals from the sensors to make control decisions for the engine system 100.

The ECM 114 may communicate with a transmission control module 194 to coordinate operation of the engine 102 with a transmission (not shown). For example only, the ECM 114 may reduce engine output torque for a gear shift within the transmission. Torque output by the engine 102 may be transferred to the transmission via a torque transmission device (not shown), such as a torque converter.

The transmission control module 194 may also share data with the ECM 114, such as a gear ratio selected within the transmission and a commanded state of a torque converter clutch (TCC) (not shown) of the torque converter. For example only, the state of the TCC may include a locked state or an unlocked state.

The state of the TCC may be related to an amount of TCC slip. TCC slip may refer to a difference between the RPM and a transmission input shaft speed. The TCC may be said to be in the locked state when the TCC slip is approximately zero. The TCC may also be said to be in the locked state when the TCC slip is being controlled to less than a predetermined slip (e.g., 15 revolutions per minute). The predetermined slip may be greater during gear shift events. The TCC may be said to be in the unlocked state when the TCC slip is greater than the predetermined slip.

The ECM 114 may also communicate with a hybrid control module 196 to coordinate operation of the engine 102 and an electric motor 198. The electric motor 198 may also function as a generator, and may selectively be used to produce electrical energy for use by vehicle electrical systems and/or for storage in a battery. The electric motor 198 may also function as a starter to drive rotation of the crankshaft to startup the engine 102. The electric motor 198 may also function as a motor to supplement/assist the engine 102.

An output of the electric motor 198 may be linked to the crankshaft of the engine 102, for example, by a belt. The electric motor 198 may be referred to as a belt-alternator-starter (BAS). Accordingly, the electric motor 198 may affect the amount of torque input to the transmission. In various implementations, various functions of the ECM 114, the transmission control module 194, and the hybrid control module 196 may be integrated into one or more modules.

An engine actuator varies one or more engine parameters by controlling an associated actuator value. For example only, the throttle actuator module 116 may be referred to as an engine actuator and the throttle opening area may be the associated actuator value. In the example of FIG. 1, the throttle actuator module 116 achieves the throttle opening area by adjusting an angle of the blade of the throttle valve 112.

Similarly, the spark actuator module 126 may be referred to as an engine actuator, while the associated actuator value may refer to the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the associated actuator values may include number of activated cylinders, fueling rate, intake and exhaust cam phaser angles, boost pressure, and EGR valve opening area, respectively. The ECM 114 may control actuator values in order to cause the engine 102 to generate a desired engine output torque and achieve desired engine parameters.

Figure 2:
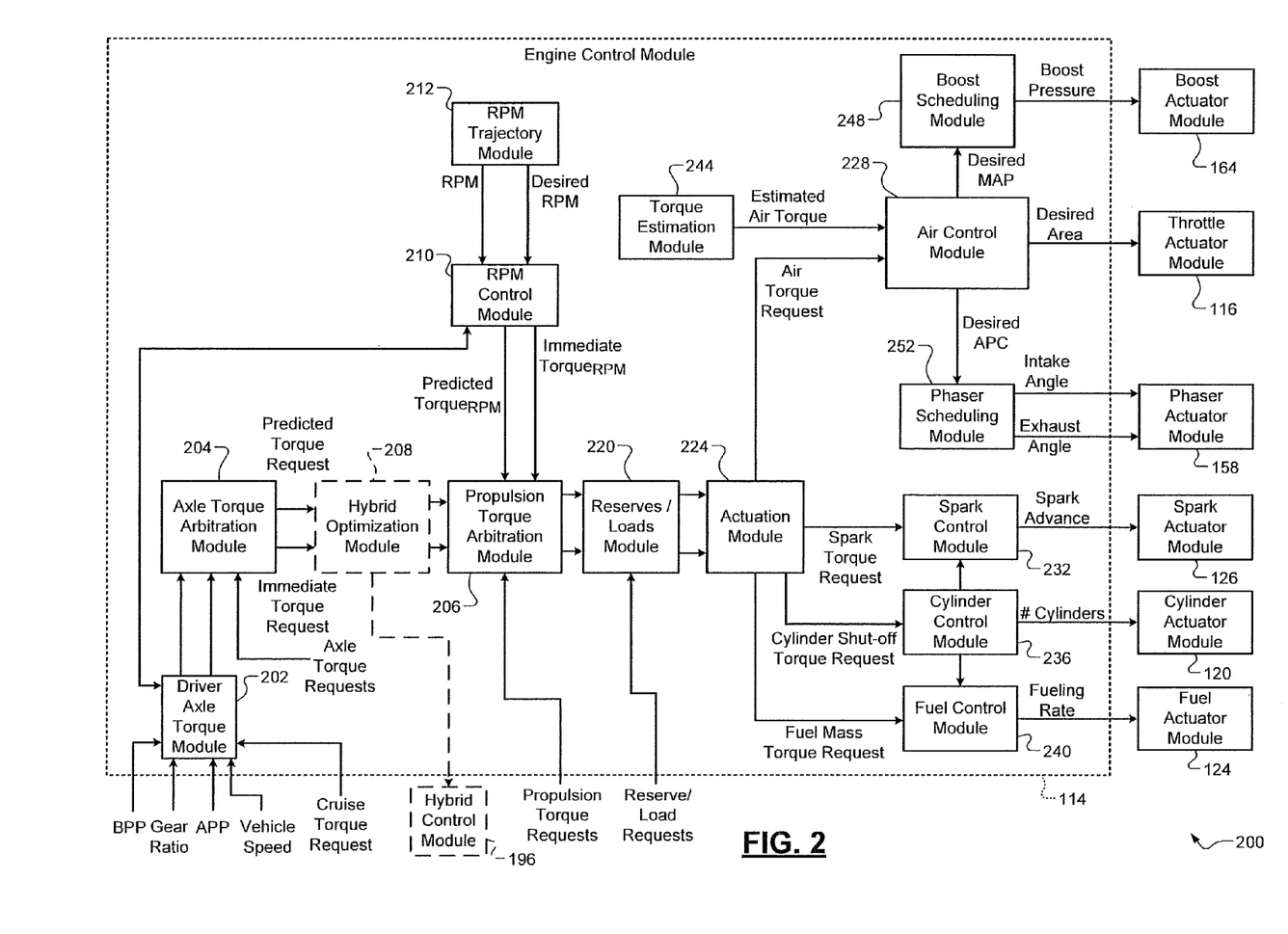
FIG. 2 is a functional block diagram of an exemplary implementation of an engine control system according to the principles of the present disclosure.

Referring now to FIG. 2, a functional block diagram of an exemplary engine control system 200 is presented. An exemplary implementation of the ECM 114 includes a driver axle torque module 202. The driver axle torque module 202 may determine a final driver axle request as discussed below in conjunction with the exemplary embodiments of FIGS. 3 and 4.

An axle torque arbitration module 204 arbitrates between the driver axle torque request from the driver axle torque module 202 and other axle torque requests. The other axle torque requests may include a torque reduction requested by a traction control system when positive wheel slip is detected. Positive wheel slip may occur when axle torque (i.e., torque to the wheels) overcomes friction between the wheels and the road surface, and the wheels slip with respect to the road surface in a forward direction. The other axle torque requests may also include a torque increase request to counteract negative wheel slip, where a tire of the vehicle slips with respect to the road surface in a reverse direction because the axle torque is negative.

The other axle torque requests may also include brake management requests and vehicle over-speed torque requests. Brake management requests may request an engine torque reduction to ensure that the engine output torque does not exceed the ability of the brakes to hold the vehicle when the vehicle is stopped. Vehicle over-speed torque requests may request an engine torque reduction to prevent the vehicle from exceeding a predetermined speed. The other axle torque requests may also be generated by vehicle stability control systems.

The axle torque arbitration module 204 outputs a predicted torque request and an immediate torque request based on the results of arbitrating between the received axle torque requests. As described below, the predicted and immediate torque requests from the axle torque arbitration module 204 may selectively be adjusted by other modules of the ECM 114 before being used to control actuators of the engine 102.

In general terms, the immediate torque request is the amount of currently desired engine output torque, and the predicted torque request is the amount of engine output torque that may be needed on short notice. The ECM 114 controls the engine 102 to achieve the immediate torque request. However, different combinations of actuator values may result in the same engine output torque. The ECM 114 may therefore adjust one or more of the actuator values to allow for a faster transition to the predicted torque request, while still maintaining the engine output torque at the immediate torque request.

In various implementations, the predicted torque request may be based on the driver axle torque request. The immediate torque request may be less than the predicted torque request, such as when the driver axle torque request is causing positive wheel slip on an icy surface (i.e., low coefficient of friction). In such a case, a traction control system (not shown) may request an engine torque reduction via the immediate torque request, and the ECM 114 reduces the engine output torque to the immediate torque request. However, the ECM 114 controls the actuator values so that the engine 102 is capable of quickly resuming the production of the predicted torque request once the wheel slip ends.

The difference between the immediate torque request and the predicted torque request may be referred to as a torque reserve. The torque reserve represents the amount of additional torque (above the immediate torque request) that the engine 102 can begin to produce with minimal delay. Fast engine actuators are used to increase or decrease the engine output torque to achieve the immediate torque request. As described in more detail below, fast engine actuators are defined in contrast with slow engine actuators.

In various implementations, fast engine actuators are capable of varying the engine output torque within a range, where the range is established by the slow engine actuators. In such implementations, the upper limit of the range is the predicted torque request, while the lower limit of the range is limited by the torque capacity of the fast engine actuators. For example only, fast engine actuators may only be able to reduce the engine output torque by a first amount, where the first amount is a measure of the torque capacity of the fast actuators. The first amount may vary based on engine operating conditions set by the slow engine actuators. When the immediate torque request is within the range, fast engine actuators can be set to cause the engine output torque to be equal to the immediate torque request. When the ECM 114 requests that the engine output torque equal the predicted torque request, the fast engine actuators can be controlled to vary the engine output torque to the top of the range, which is the predicted torque request.

Comparatively, the fast engine actuators can more quickly change the engine output torque than the slow engine actuators. The slow engine actuators may respond more slowly to changes in their respective actuator values than fast engine actuators do. For example only, a slow engine actuator may include mechanical components that require time to move from one position to another in response to a change in actuator value.

A slow engine actuator may also be characterized by the amount of time it takes for the engine output torque to respond once the slow engine actuator begins to implement the changed actuator value. Generally, this response time will be longer for slow engine actuators than for fast engine actuators. In addition, even after beginning to change, the engine output torque may take longer to fully respond to a change to an actuator value associated with a slow engine actuator.

For example only, the ECM 114 may set actuator values associated with the slow engine actuators to values that would enable the engine 102 to produce the predicted torque request if the fast engine actuators were set to appropriate values. Meanwhile, the ECM 114 may set actuator values associated with the fast engine actuators to values that, given the slow actuator values, cause the engine 102 to produce the immediate torque request instead of the predicted torque request.

The fast actuator values therefore cause the engine 102 to produce the immediate torque request. When the ECM 114 decides to transition the engine output torque from the immediate torque request to the predicted torque request, the ECM 114 changes the actuator values associated with one or more fast actuators to values that correspond to the predicted torque request. Because the slow actuator values have already been set based on the predicted torque request, the engine 102 is able to produce the predicted torque request after only the delay imposed by the fast engine actuators. The longer delay that would otherwise result from changing the engine output torque using slow engine actuators may therefore be avoided.

For example only, when the predicted torque request is equal to a driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request. The resulting torque reserve can absorb sudden increases in required engine output torque. For example only, sudden loads from an air conditioning compressor and/or a power steering pump may be counterbalanced by increasing the immediate torque request. If the increase in immediate torque request is less than the torque reserve, the increase can be quickly produced by using the fast engine actuators. The predicted torque request may then also be increased to re-establish the previous torque reserve.

Another exemplary use of a torque reserve is to reduce fluctuations in slow actuator values. Because of their relatively slow speed, varying slow actuator values may produce control instability. In addition, slow engine actuators may include mechanical parts, which may draw more power and/ or wear more quickly when moved frequently. Creating a sufficient torque reserve allows changes in desired torque to be made by varying fast engine actuators via the immediate torque request while maintaining the actuator values of the slow engine actuators. For example, to maintain a given idle speed, the immediate torque request may vary within a range. If the predicted torque request is set to a level above this range, variations in the immediate torque request that maintain the idle speed can be made using fast engine actuators without the need to adjust slow engine actuators.

For example only, in a spark-ignition engine, spark timing may be a fast engine actuator, while throttle opening area may be a slow engine actuator. Spark-ignition engines may combust fuels including, for example, gasoline and ethanol, by applying a spark. By contrast, a compression-ignition engine may combust fuels including, for example, diesel, by compressing the fuels.

After receiving a new actuator value, the spark actuator module 126 may be able to change the spark timing for a firing event of a next cylinder in a firing order. When the spark timing for a firing event is set to a calibrated value, maximum torque is produced during the combustion stroke immediately following that firing event. However, a spark timing deviating from the calibrated value may reduce the amount of torque produced in the combustion stroke. Therefore, the spark actuator module 126 may be able to vary engine output torque as soon as the next firing event occurs by varying the spark timing. For example only, a table of spark timings corresponding to different engine operating conditions may be determined during a calibration phase of vehicle design, and the calibrated value is selected from the table based on current engine operating conditions.

By contrast, changes in throttle opening area take longer to affect the engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position corresponding to the new actuator value.

In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces the engine output torque) based on the immediate torque request. The engine output torque will therefore be equal to the immediate torque request.

When additional torque is needed, such as when the air conditioning compressor is started, the spark timing can be set based on the predicted torque request. By the next firing event, the spark actuator module 126 may return the spark advance to a calibrated value, which allows the engine 102 to produce engine torque output equal to the predicted torque request as the air flow is already present. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels or axles) into a propulsion torque domain (torque at the crankshaft). This conversion may occur before, after, as part of, or in place of the hybrid optimization module 208.

The propulsion torque arbitration module 206 arbitrates between the converted predicted and immediate torque requests and other propulsion torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

The other propulsion torque requests may include engine torque reductions requested for engine over-speed protection, engine torque increases requested for stall prevention, and engine torque reductions requested by the transmission control module 194 to accommodate gear shifts. The other propulsion torque requests may also result from clutch fuel cut-off, which reduces the engine output torque when the driver depresses the clutch pedal in a manual transmission vehicle to prevent a flare (rapid rise) in engine speed.

The other propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. The RPM mode may be selected when the driver removes pressure from the accelerator pedal, such as when the vehicle is idling or coasting. Alternatively or additionally, the RPM mode may be selected when the predicted torque request from the axle torque arbitration module 204 is less than a calibratable torque value, such as when the engine 102 is idling.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine 102 and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the A/C compressor clutch.

The actuation module 224 receives the adjusted predicted and immediate torque requests from the reserves/loads module 220. The actuation module 224 determines how the adjusted predicted and immediate torque requests will be achieved. The actuation module 224 may be engine type specific. For example only, the actuation module 224 may be implemented differently or use different control schemes for spark-ignition engines versus compression-ignition engines.

In various implementations, the actuation module 224 may define a boundary between modules that are common across all engine types and modules that are engine type specific. For example only, engine types may include spark-ignition and compression-ignition. Modules prior to the actuation module 224, such as the propulsion torque arbitration module 206, may be common across engine types, while the actuation module 224 and subsequent modules may be engine type specific.

For example only, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other engine actuators.

An air control module 228 may determine desired actuator values based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel mass torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of one or more cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel mass torque request from the actuation module 224. During normal operation of a spark-ignition engine, the fuel control module 240 may attempt to maintain a stoichiometric air/fuel ratio. The fuel control module 240 may therefore determine a fuel mass that will yield stoichiometric combustion when combined with the current mass of air per cylinder. The fuel control module 240 may instruct the fuel actuator module 124 to inject this fuel mass for each activated cylinder.

Based on the fuel mass torque request, the fuel control module 240 may adjust the air/fuel ratio with respect to stoichiometry to increase or decrease the engine output torque. The fuel control module 240 may then determine a fuel mass for each cylinder that achieves the desired air/fuel ratio. In diesel systems, fuel mass may be the primary actuator for controlling the engine output torque.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T = f(APC, S, I, E, AF, OT, \#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve. This relationship may be modeled by an equation and/or may be stored as a lookup table.

The torque estimation module 244 may determine the APC based on the MAF and the RPM, thereby allowing closed loop air control based on actual air flow. The intake and exhaust cam phaser positions used may be based on actual positions, as the phasers may be traveling toward desired positions.

The actual spark advance may be used to estimate the engine output torque. When a calibrated spark advance value is used to estimate the engine output torque, the estimated torque may be called an estimated air torque, or simply air torque. The air torque may be an estimate of how much torque the engine 102 could generate at the current air flow if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and/or superchargers.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#). \quad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when low octane fuel is used) and environmental factors. The torque at the calibrated spark advance may therefore be less than MBT.

Figure 3:
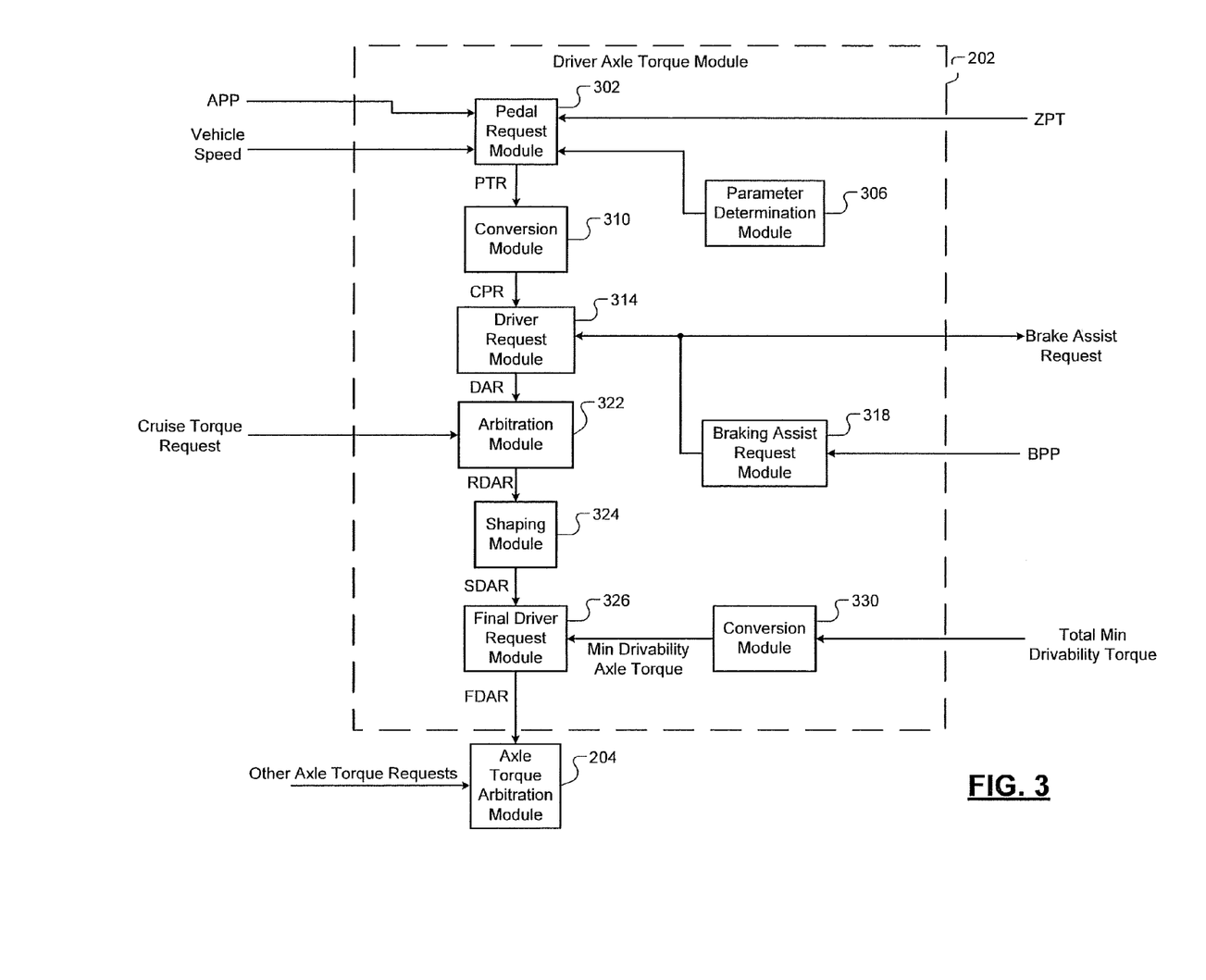
FIG. 3 is a functional block diagram of an exemplary implementation of a driver axle torque module according to the principles of the present disclosure.

Referring now to FIG. 3, a functional block diagram of an exemplary implementation of the driver axle torque module 202 is presented. The driver axle torque module 202 may include a pedal request module 302, a parameter determination module 306, a conversion module 310, and a driver request module 314. The driver axle torque module 202 may also include a braking assist request module 318, an arbitration module 322, a shaping module 324, a final driver request module 326, and a conversion module 330.

The pedal request module 302 determines a pedal torque request (PTR). The pedal request may be in terms of the propulsion torque domain (i.e., torque at the crankshaft). The pedal request module 302 may determine the pedal torque request based on the APP, the vehicle speed, a zero pedal torque, and/or other suitable parameters. For example only, the pedal request module 302 may determine the pedal torque request using the equation:

$$PTR = ZPT + (100\% \ PedalTorque * AmbCorr - ZPT) * PedalCorr, \quad (3)$$

where PTR is the pedal torque request (e.g., Nm), ZPT is the zero pedal torque (e.g., Nm) for when the accelerator pedal is at a zero position (e.g., 0%), 100% PedalTorque is a maximum torque (e.g., Nm) at the crankshaft when the accelerator pedal is fully depressed (e.g., at 100%), AmbCorr is a correction (e.g., a scalar) for the ambient air pressure, and PedalCorr is a correction (e.g., a scalar) for the magnitude of the APP.

The zero pedal torque (ZPT) may be determined by the RPM control module 210 as discussed below in conjunction with the exemplary embodiment of FIG. 4. The 100% PedalTorque, the ambient pressure correction, and/or the pedal correction may be provided by the parameter determination module 306 or another suitable source. For example only, the 100% PedalTorque may be determined using the equation:

$$100\% \ PedalTorque = MaxEngTorque + MaxMotorTorque * MotorCorr, \quad (4)$$

where MaxEngTorque is a maximum engine torque output (e.g., Nm), MaxMotorTorque is a maximum torque output of the electric motor 198 (e.g., Nm), and MotorCorr is a correction (e.g., a scalar) for how much of the torque output of the electric motor 198 is translated to torque at the crankshaft. The maximum engine torque output and the maximum torque output of the electric motor 198 may be determined based on the engine speed and other suitable parameters. The ambient pressure correction may be determined based on a comparison of the ambient air pressure and a predetermined ambient air pressure. The pedal correction may be determined based on where the APP is within the range of actuation of the accelerator pedal (e.g., between 0% and 100%).

The conversion module 310 receives the pedal torque request and converts the pedal torque request into the axle torque domain (i.e., torque at the wheels or axles). After being converted into the axle torque domain, the request may be referred to as a converted pedal request (CPR). The conversion module 310 may convert the pedal torque request based on, for example, drivetrain losses, the gear ratio selected within the transmission, one or more torque ratios, and other suitable parameters.

The driver request module 314 determines a driver axle request (DAR) based on the converted pedal request. The driver axle request is in terms of the axle torque domain (i.e., torque at the wheels or axles). The driver request module 314 determines the driver axle request further based on a braking assist torque request. For example only, the driver request module 314 may determine the driver axle torque request using the equation:

$$DAR = CPR - BAR, \qquad (5)$$

where DAR is the driver axle request (e.g., Nm), CPR is the converted pedal request (e.g., Nm), and BAR is the braking assist torque request (e.g., Nm).

The braking assist request module 318 may determine the braking assist torque request (e.g., Nm) and provide the braking assist torque request to the driver request module 314. The braking assist request may refer to a decrease in the engine output torque attributable to regenerative braking by the electric motor 198 requested to assist the mechanical brakes of the vehicle during vehicle braking. Performing regenerative braking generates electrical power and allows a reduced amount of mechanical braking to be used. The braking assist request module 318 may determine the braking assist request based on the BPP. The hybrid control module 196 or the hybrid optimization module 208 may control regenerative braking performed by the electric motor 198 based on the braking assist request.

The arbitration module 322 receives the driver axle request and other driver torque requests and arbitrates between the received requests. For example only, the arbitration module 322 may arbitrate between the driver axle request and the cruise torque request. The arbitration module 322 outputs the winner of the arbitration as a raw driver axle request (RDAR) (e.g., Nm). The raw driver axle request is in terms of the axle torque domain (i.e., torque at the wheels or axles).

The shaping module 324 receives the raw driver axle request and selectively shapes the raw driver axle request into a shaped driver axle request (SDAR). The shaping module 324 may shape the raw driver axle request, for example, to reduce or prevent a "bump" that may be experienced when the driver tips into or tips out of the accelerator pedal. For example only, the shaping module 324 may apply one or more filters to the raw driver axle request to determine the shaped driver axle request. The shaped driver axle request is in terms of the axle torque domain (i.e., torque at the wheels or axles).

The final driver request module 326 determines the final driver axle request (FDAR) that is provided to the axle torque arbitration module 204 for arbitration with the other axle torque requests. The final driver request module 326 may generally set the final driver axle request (e.g., Nm) equal to the shaped driver axle request.

The final driver request module 326 may selectively limit the final driver axle request to a minimum drivability axle torque (Min Drivability Axle Torque). In other words, the final driver request module 326 may set the final driver axle request equal to a greater one of the shaped driver axle request and the minimum drivability axle torque (e.g., Nm). The minimum drivability axle torque may refer to a minimum amount of axle torque selected to maintain vehicle drivability (e.g., prevent engine stalling) and minimize fuel consumption (e.g., through use of deceleration fuel cutoff and/or regenerative braking).

The conversion module 330 may determine the minimum drivability axle torque based on a total minimum drivability torque (Total Min Drivability Torque). More specifically, the conversion module 330 may convert the total minimum drivability torque from the propulsion torque domain into the axle torque domain. The conversion may be similar or identical to the conversion performed by the conversion module 310.

The total minimum drivability torque may refer to an amount of torque (e.g., Nm) at the crankshaft selected to maintain the vehicle drivability and minimize the fuel consumption. The total minimum drivability torque is discussed further below in conjunction with the exemplary embodiment of FIG. 4.

Figure 4:
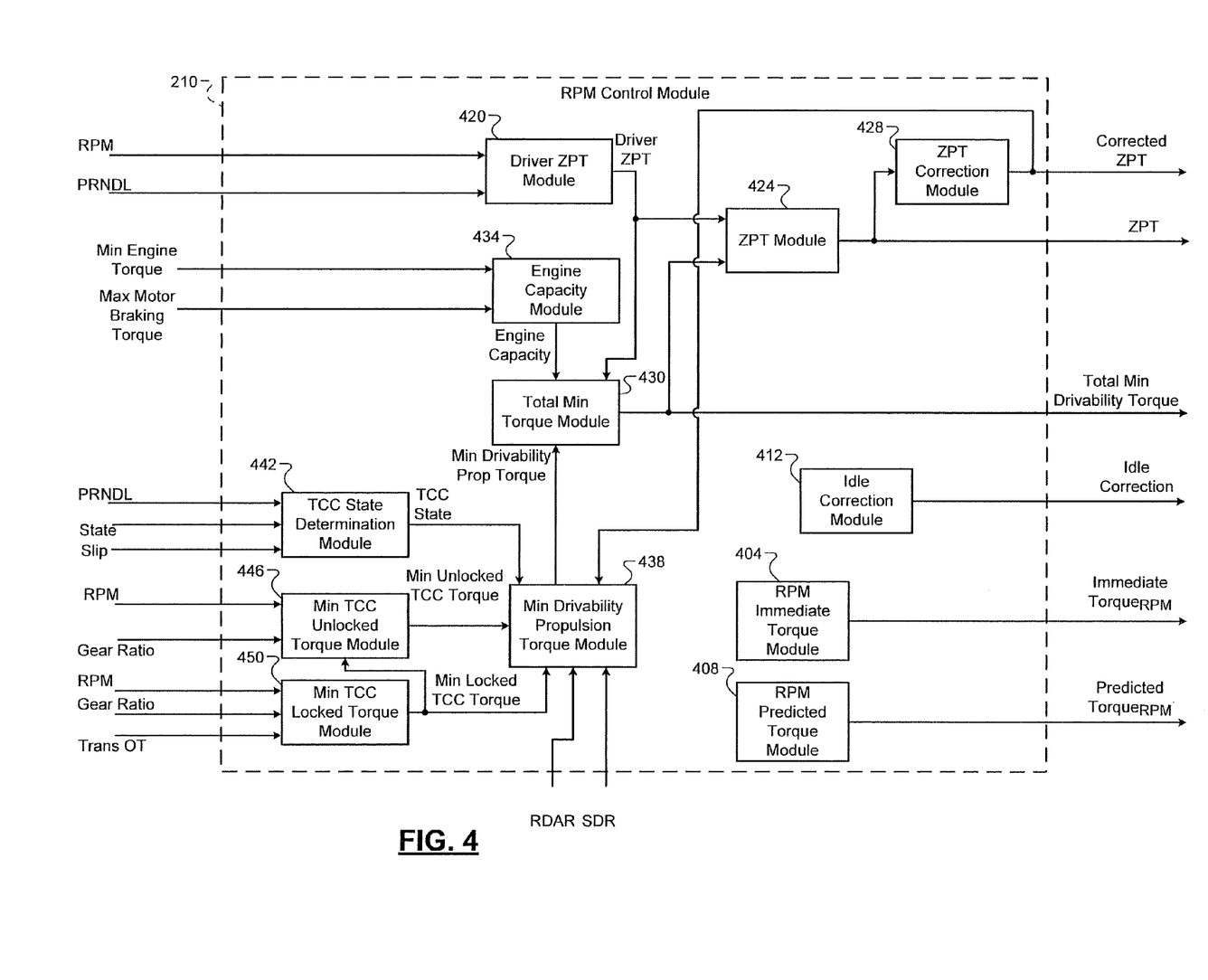
FIG. 4 is a functional block diagram of an exemplary implementation of a revolutions per minute (RPM) control module according to the principles of the present disclosure.

Referring now to FIG. 4, a functional block diagram of an exemplary implementation of the RPM control module 210 is presented. The RPM control module 210 may include an RPM immediate torque module 404, an RPM predicted torque module 408, an idle correction module 412, a driver zero pedal torque (ZPT) module 420, a ZPT module 424, and a ZPT correction module 428. The RPM control module 210 may also include a total min torque module 430, an engine capacity module 434, a min drivability propulsion torque module 438, a TCC state determination module 442, a min TCC unlocked torque module 446, and a min TCC locked torque module 450.

The RPM immediate torque module 404 determines the RPM immediate torque request. The RPM predicted torque module 408 determines the RPM predicted torque request. The RPM immediate and predicted torque requests may be provided to the propulsion torque arbitration module 206 for arbitration with the other propulsion torque requests. The RPM immediate and predicted torque modules 404 and 408 may control the RPM immediate and predicted torque requests, respectively, to reduce the difference between the desired RPM and the RPM.

The Idle correction module 412 determines the idle correction. The idle correction may be used in determining the driver axle request as discussed above. The idle correction may refer to a learned torque correction (e.g., Nm) in the axle torque domain to compensate for calculation differences, component differences, and other differences between the vehicle and a predetermined vehicle. For example only, the differences may include a difference between an estimated engine torque output and an actual engine torque output, a difference between an expected torque load of the transmission and an actual torque load of the transmission, and other suitable differences.

The driver ZPT module 420 determines a driver ZPT (e.g., Nm). The driver ZPT module 420 may determine the driver ZPT based on the RPM and the PRNDL position. The driver ZPT may correspond to a desired engine output torque when the accelerator pedal is not being depressed (e.g., when the accelerator pedal is at 0%). The desired engine torque output may cause the vehicle to coast when a driver tips out of the accelerator pedal or may cause the vehicle to move at a minimum vehicle speed (i.e., creep) when the brakes are not depressed and the vehicle is on a flat surface.

The ZPT module 424 determines the ZPT (e.g., Nm) based on the driver ZPT and the total minimum drivability torque. The ZPT module 424 may generally set the ZPT equal to the driver ZPT and limit the ZPT to the total minimum drivability torque. In other words, the ZPT module 424 may set the ZPT equal to a greater one of the driver ZPT and the total minimum drivability torque. Limiting the ZPT to the total minimum drivability torque may prevent a dead pedal situation when the driver tips into the accelerator pedal. Dead pedal may refer to when a change torque is not experienced when the driver tips into the accelerator pedal.

The ZPT correction module 428 may determine a torque correction to account for the calculation differences, the component differences, and the other differences between the vehicle and a predetermined vehicle as discussed above in conjunction with the idle correction. For example only, the torque correction may be the propulsion torque domain equivalent of the idle correction. More specifically, the torque correction may be the idle correction after conversion into the propulsion torque domain. The ZPT correction module 428 determines a corrected ZPT based on the ZPT and the torque correction. For example only, the ZPT correction module 428 may determine the corrected ZPT based on a sum of the ZPT and the torque correction.

The total min torque module 430 determines the total minimum drivability torque (e.g., Nm). For example only, the total min torque module 430 may set the total minimum drivability torque equal to a greater one of an engine capacity and a minimum drivability propulsion torque (Min Drivability Prop Torque). The engine capacity may be determined by the engine capacity module 434. The minimum drivability propulsion torque may be determined by the min drivability propulsion torque module 438, which is discussed further below.

The engine capacity module 434 may determine the engine capacity based on a minimum torque of the engine 102 (Min Engine Torque) and a maximum braking torque of the electric motor 198 (Max Motor Braking Torque). For example only, the engine capacity module 434 may determine the engine capacity (e.g., Nm) based on the minimum engine torque (e.g., Nm) less the maximum braking torque (e.g., Nm). The engine capacity is in the propulsion torque domain.

The maximum braking torque may refer to a maximum braking torque that the electric motor 198 is capable of applying during regenerative braking. For example only, the maximum braking torque may be approximately 150 Nm of braking torque at the crankshaft. The minimum engine torque may refer to the engine torque output with a minimum air per cylinder (APC) at which proper combustion will occur with maximum retardation of the spark timing when deceleration fuel cutoff (DFCO) is not allowed. When DFCO is allowed, the minimum engine torque may refer to an amount of torque that may be necessary to rotate the crankshaft during DFCO. For example only, the minimum engine torque may be approximately 30 Nm. DFCO may be not allowed, for example, when the exhaust may include more than a predetermined amount of a predetermined exhaust constituent or to prevent engine damage.

The min drivability propulsion torque module 438 may determine the minimum drivability propulsion torque (e.g., Nm). The min drivability propulsion torque module 438 may determine the minimum drivability propulsion torque based on a minimum unlocked TCC torque and a minimum locked TCC torque. The min drivability propulsion torque module 438 may selectively set the minimum drivability propulsion torque equal to the minimum unlocked TCC torque or to the minimum locked TCC torque and may selectively transition from one of the minimum unlocked and locked TCC torques to the other.

The min drivability propulsion torque module 438 may selectively transition the minimum drivability propulsion torque to the minimum unlocked TCC torque or to the minimum locked TCC torque based on one or more parameters. For example only, the parameters may include the state of the TCC, the shaped driver axle request, the driver axle request, the minimum unlocked TCC torque, and the corrected ZPT. The min drivability propulsion torque module 438 may also determine how to accomplish a transition based on one or more of the parameters.

The TCC state determination module 442 may generate a TCC state signal that indicates whether the TCC is in the locked state or in the unlocked state. For example only, the TCC state determination module may set the TCC state signal to an active state (e.g., 5 V) when the TCC is in the locked state and may set the TCC state signal to an inactive state (e.g., 0 V) when the TCC is in the unlocked state.

The TCC state determination module 442 may determine whether the TCC is in the locked state or the unlocked state based on one or more parameters, such as the TCC slip, the PRNDL position, and the commanded state of the TCC. For example only, the TCC state determination module 442 may determine that the TCC is in the locked state when, for at least a predetermined period, the commanded state is the locked state, the TCC slip is less than a predetermined slip, and the PRNDL is not in the neutral position or in the park position. The TCC state determination module 442 may also verify that no communication faults or hardware faults have been detected before setting the TCC state signal to indicate that the TCC is in the locked state. The predetermined slip may be greater than or equal to the slip for when the TCC is in the controlled slip state.

The min TCC unlocked torque module 446 may determine the minimum unlocked TCC torque (e.g., Nm). For example only, the min TCC unlocked torque module 446 may determine the minimum unlocked TCC torque based on the RPM and the gear ratio selected within the transmission. The minimum unlocked TCC torque may refer to a minimum amount of propulsion torque at the TCC to prevent engine stalling when the TCC is in the unlocked state.

The min TCC locked torque module 450 determines the minimum locked TCC torque (e.g., Nm). For example only, the min TCC locked torque module 450 may determine the min locked TCC torque based on the RPM, the gear ratio, and a transmission oil temperature (Trans OT). The minimum locked TCC torque may refer to a minimum amount of torque at the TCC to prevent engine stalling when the TCC is in the locked state. A torque that is more negative than the minimum locked TCC torque may cause the TCC to slip and thus prevent torque transfer from the transmission to the engine 102.

The minimum TCC unlocked torque is greater than or equal to the min TCC locked torque. To ensure this relationship remains true, the min TCC unlocked torque module 446 may set the minimum unlocked TCC torque equal to the greater of the minimum unlocked TCC torque and the minimum locked TCC torque.

When the driver ZPT is greater than the minimum unlocked TCC torque, the min drivability propulsion torque module 438 may transition the minimum drivability propulsion torque to the minimum unlocked TCC torque or to the minimum locked TCC torque. For example only, the min drivability propulsion torque module 438 may transition the minimum drivability propulsion torque to the minimum unlocked TCC torque when the TCC is in the unlocked state and the driver ZPT is greater than the minimum unlocked TCC torque. The min drivability propulsion torque module 438 may transition the minimum drivability propulsion torque to the minimum locked TCC torque when the TCC is in the locked state and the driver ZPT is greater than the minimum unlocked TCC torque.

For these two transitions, the min drivability propulsion torque module 438 may employ a jump step. A jump step transition may involve transitioning the minimum drivability propulsion torque to the minimum unlocked or locked TCC torque in one control loop (i.e., in one step). Transitioning the minimum drivability propulsion torque in one control loop may prevent an engine stall by ensuring that the minimum drivability propulsion torque reaches the minimum unlocked or locked TCC torque before the driver ZPT falls below the minimum unlocked TCC torque.

When the shaped driver axle request is less than the minimum unlocked TCC torque or when the raw driver axle request is less than the corrected ZPT, the min drivability propulsion torque module 438 may transition the minimum drivability propulsion torque based on whether the TCC is in the locked or unlocked state. For example only, the min drivability propulsion torque module 438 may transition the minimum drivability propulsion torque to the minimum unlocked TCC torque and to the minimum locked TCC torque when the TCC is in the unlocked state and the locked state, respectively. For this type of transition, the min drivability propulsion torque module 438 may employ what may be referred to as a fast ramp for the transition.

The fast ramp may involve transitioning using steps of a predetermined magnitude or using steps that accomplish the transition within a predetermined period. The min drivability propulsion torque module 438 may select or determine the magnitude of the steps or the predetermined period based on the one of the minimum unlocked and locked TCC torques that the minimum drivability propulsion torque is being transitioned to. For example only, the magnitude of the steps may be greater than or the predetermined period may be shorter for a transition to the minimum unlocked TCC torque than the magnitude of the steps or the predetermined period, respectively, for a transition to the minimum locked TCC torque. This may be because a transition to the minimum unlocked TCC torque may be performed to prevent engine stalling while a transition to the locked TCC torque may be for fuel conservation (through earlier use of DFCO).

When the shaped driver axle request is greater than the minimum unlocked TCC torque and the driver axle request is greater than the corrected ZPT, the min drivability propulsion torque module 438 may transition the minimum drivability propulsion torque to the minimum locked TCC torque. The min drivability propulsion torque module 438 may employ what may be referred to as a slow ramp for the transition, where slow is defined relative to the fast ramp described above. In other words, transitioning to the minimum locked TCC torque using a slow ramp may take longer to accomplish than if the fast ramp was used for the transition. This type of transition may be performed slowly as the shaped driver axle request is greater than the minimum unlocked TCC torque, the torque below which an engine stall may occur when the TCC is in the unlocked state. The slow ramp may provide a smooth (e.g., linear) feel during the transition. The relationship between the APP and the pedal torque request may be changed in a relatively short period to avid an engine stall if the driver tips into the accelerator pedal by changing the ZPT via the total minimum drivability torque.

The min drivability propulsion torque module 438 may determine the ramp rate for the slow ramp based on, for example, a period during which the shaped driver axle request has been less than or equal to the minimum unlocked TCC torque. For example only, the ramp rate may decrease as the period increases. Transitions to the min locked TCC torque may be performed for fuel conservation. More specifically, DFCO and/or regenerative braking may be performed earlier, thus conserving fuel.

As discussed above, the total min torque module 430 sets the total minimum drivability torque equal to a greater one of the engine capacity and the minimum drivability propulsion torque. The ZPT module 424 sets the ZPT to a greater one of the driver ZPT and the total minimum drivability torque. Since the pedal request module 302 determines the pedal request based on the ZPT, the total minimum drivability torque may be reflected in the pedal request. The total minimum drivability torque may therefore also be reflected in the shaped driver axle request, the converted shaped driver axle request, the driver axle request, and the final driver axle request. The final driver request module 326 may also set the final driver axle request to a greater one of the driver axle request and the minimum drivability axle torque (i.e., the total minimum drivability torque converted into the axle torque domain).

Figure 5A:
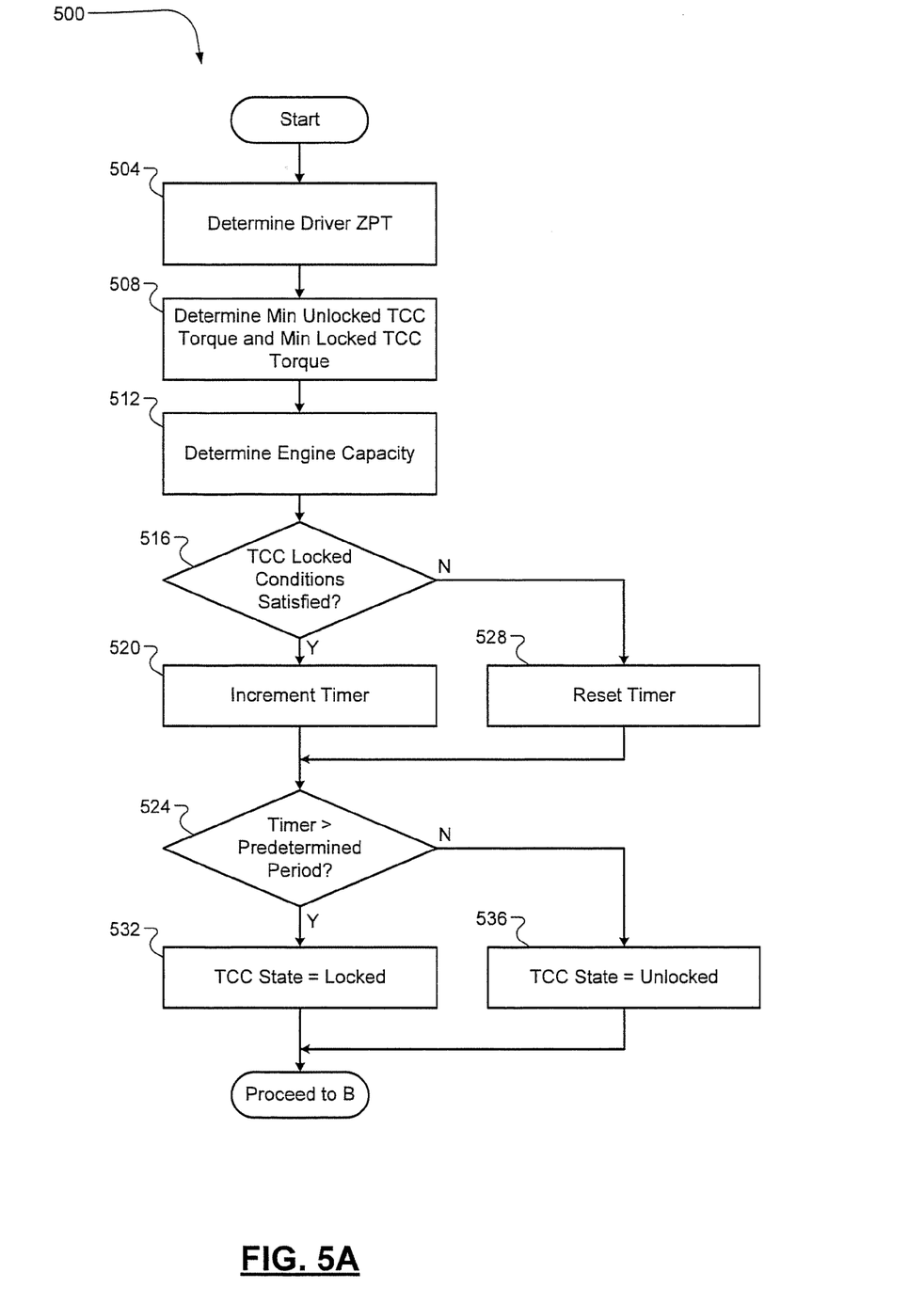
FIGS. 5A-5C depict an exemplary method of determining a final driver axle torque request according to the principles of the present disclosure.
Figure 5B:
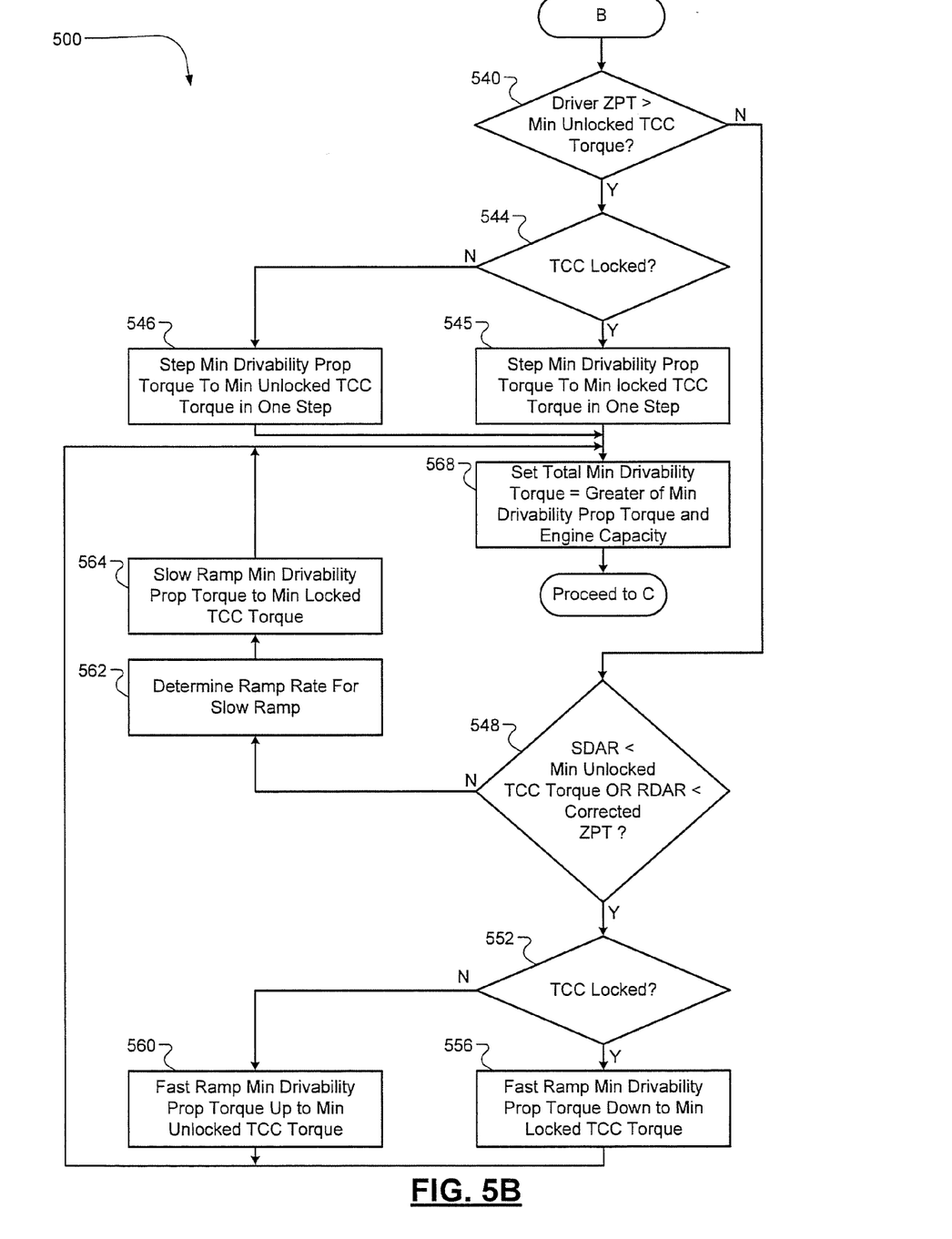
Figure 5C:
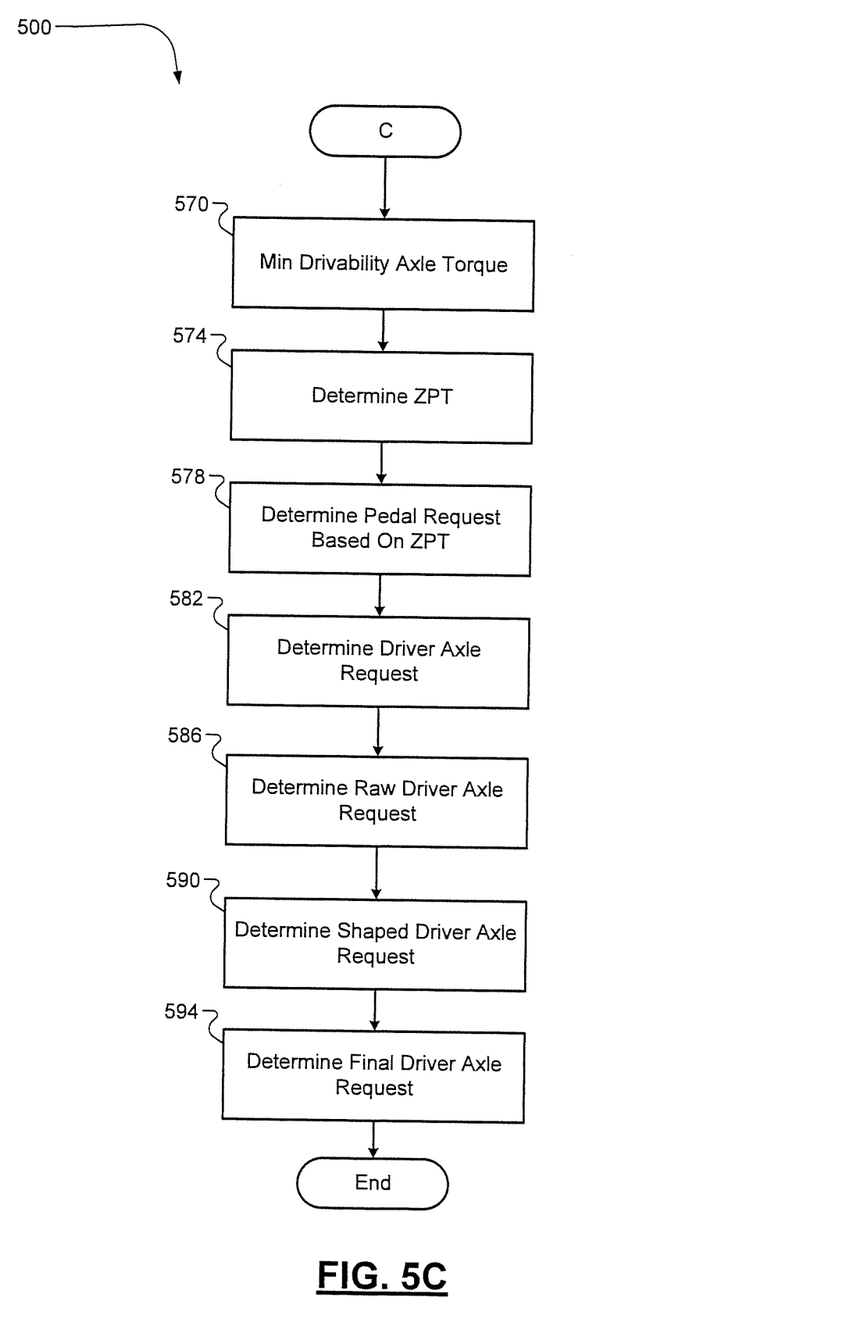

Referring now to FIGS. 5A-5C, a flowchart depicting an exemplary method 500 is presented. Control may begin at 504 where control may determine the driver ZPT. Control may determine the driver ZPT, for example, based on the RPM and the PRNDL position.

Control may determine the minimum unlocked TCC torque and the minimum locked TCC torque at 508. Control may determine the minimum unlocked TCC torque based on the RPM and the gear ratio, and control may determine the minimum locked TCC torque based on the RPM, the gear ratio, and the transmission oil temperature. Control may determine the engine capacity at 512. Control may determine the engine capacity based on a difference between the minimum engine torque and the maximum braking torque.

At 516, control may determine whether the TCC locked conditions are satisfied. If true, control may increment a timer at 520 and continue with 524; if false, control may reset the timer at 528 and continue with 524. The TCC locked conditions may be satisfied when the commanded state of the TCC is the locked state or the controlled slip state, the slip is less than the predetermined slip, and the PRNDL position is not the neutral position or the park position.

Control may determine whether the timer is greater than the predetermined period at 524. If true, control may determine that the TCC is in the locked state at 532 and continue with B of FIG. 5B; if false, control may determine that the TCC is in the unlocked state at 536 and continue with B of FIG. 5B.

Referring now to FIG. 5B, control may enter from B and determine whether the driver ZPT is greater than the minimum unlocked TCC torque at 540. If false, control may continue with 548; if true, control may continue with 544. At 544, control may determine whether the TCC is in the locked state as determined in FIG. 5A. If true, control may continue with 545; if false, control may continue with 546.

At 545, control may step the minimum drivability propulsion torque to the minimum locked TCC torque in one step. Stated another way, the minimum drivability propulsion torque may be set to the minimum locked TCC torque at 545. At 546, control may step the minimum drivability propulsion torque to the minimum unlocked TCC torque in one step. Stated another way, the minimum drivability propulsion torque may be set to the minimum unlocked TCC torque at 546. Control may continue with 568 after 545 or 546, and 568 is discussed below.

At 548, control may determine whether the shaped driver axle request is less than the minimum unlocked TCC torque or whether the raw driver axle request is less than the corrected ZPT. If either is true, control may continue with 552; if both are false, control may continue with 562, which is discussed further below.

At 552, control may determine whether the TCC is in the locked state as determined in FIG. 5A. If true, control may continue with 556; if false, control may continue with 560. At 556, control may use a fast ramp and transition the minimum drivability propulsion torque down to the minimum locked TCC torque. At 560, control may use a fast ramp and transition the minimum drivability propulsion torque up to the minimum unlocked TCC torque. The fast ramp for a transition up to the minimum unlocked TCC torque may be faster (i.e., at a greater ramp rate) than the fast ramp for a transition down to the minimum locked TCC torque.

At 562 (when the shaped driver axle request is greater than or equal to than the minimum unlocked TCC torque and the raw driver axle request is greater than or equal to the corrected ZPT at 548), control may determine a ramp rate for a slow ramp transition. Control may determine the ramp rate, for example, based on the period that the shaped driver axle request has been less than or equal to the minimum unlocked TCC torque. Control may use the determined ramp rate and transition the minimum drivability propulsion torque to the minimum locked TCC torque at 564 using the ramp rate. Control may continue with 568 after 564, 560, or 556.

At 568, control may set the total minimum drivability torque based on the engine capacity or the minimum drivability propulsion torque. For example only, control may set the total minimum drivability torque equal to a greater one of the minimum drivability torque and the engine capacity. Control may proceed with C of FIG. 5C.

Referring now to FIG. 5C, control may enter from C and determine the minimum drivability axle torque at 570. Control may determine the minimum drivability axle torque, for example, by converting the minimum drivability propulsion torque into the axle torque domain. Control may determine the ZPT at 574. For example only, control may set the ZPT equal to a greater one of the total minimum drivability torque and the driver ZPT. Control may determine the pedal torque request based on the ZPT at 578.

Control may determine the driver axle request at 582. For example only, control may determine the driver axle request by converting the pedal torque request into the axle torque domain and subtracting the braking assist torque request after the conversion. Control may determine the raw driver axle request at 5826. Control may determine the raw driver axle request, for example, based on a result of arbitrating the driver axle request with other driver torque requests (e.g., cruise torque requests). Control may selectively shape to the raw driver axle request at 590. The result of the selective shaping may be referred to as the shaped driver axle request.

At 592, control may determine the final driver axle request. For example only, control may set the final driver axle request equal to a greater one of the shaped driver axle request and the minimum drivability axle torque. Control may then end.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   a minimum torque module that selectively determines a first minimum propulsion torque based on second and third minimum propulsion torques when a torque converter clutch is in unlocked and locked states, respectively;
   a zero pedal torque module that selectively sets a zero pedal torque equal to the first minimum propulsion torque;
   a pedal request module that determines a pedal torque request based on an accelerator pedal position, a vehicle speed, and the zero pedal torque;
   a driver request module that determines a driver axle torque request based on the pedal torque request;
   a shaping module that selectively shapes the driver axle torque request and that determines a shaped driver axle torque request based on the driver axle torque request;
   a conversion module that converts the first minimum propulsion torque into a minimum axle torque; and
   a final driver request module that sets a final driver axle torque request equal to a greater one of the shaped driver axle torque request and the minimum axle torque.

2. The engine control system of claim 1 further comprising an actuation module that controls at least one engine actuator based on the final driver axle torque request.

3. The engine control system of claim 1 further comprising:
   a second zero pedal torque module that determines a second zero pedal torque based on an engine speed and a position of a park, reverse, neutral, drive lever,
   wherein the zero pedal torque module sets the zero pedal torque equal to the first minimum propulsion torque when the first minimum propulsion torque is greater than the second zero pedal torque.

4. The engine control system of claim 3 wherein, when the second zero pedal torque is greater than the second minimum propulsion torque, the minimum torque module sets the first minimum propulsion torque equal to a selected one of the second and third minimum propulsion torques when the torque converter clutch is in the unlocked state and the locked state, respectively.

5. The engine control system of claim 1 wherein the minimum torque module selectively ramps the first minimum propulsion torque to a selected one of the second and third minimum propulsion torques when the torque converter clutch is in the unlocked state and the locked state, respectively.

6. The engine control system of claim 5 wherein the minimum torque module ramps the first minimum propulsion torque to the selected one of the second and third minimum propulsion torques based on at least one of the shaped driver axle torque request and an unshaped driver axle torque request.

7. The engine control system of claim 5 wherein the minimum torque module determines a ramp rate based on the selected one of the second and third minimum propulsion torques and ramps the first minimum propulsion torque to the selected one of the second and third minimum propulsion torques at the ramp rate.

8. The engine control system of claim 7 wherein the minimum torque module sets the ramp rate to a first ramp rate when the selected one of the second and third minimum propulsion torques is the second minimum propulsion torque and to a second ramp rate when the selected one of the second and third minimum propulsion torques is the third minimum propulsion torque, and
   wherein the first ramp rate is greater than the second ramp rate.

9. The engine control system of claim 1 further comprising:
   a second minimum torque module that determines the second minimum propulsion torque based on an engine speed and a gear ratio selected with a transmission; and
   a third minimum torque module that determines the third minimum propulsion torque based on the engine speed, the gear ratio, and a transmission oil temperature.

10. The engine control system of claim 9 wherein the second minimum torque module determines a fourth minimum propulsion torque based on the engine speed and the gear ratio and sets the second minimum propulsion torque equal to a greater one of the fourth minimum propulsion torque and the third minimum propulsion torque.

11. An engine control method comprising:
- selectively determining a first minimum propulsion torque based on second and third minimum propulsion torques when a torque converter clutch is in unlocked and locked states, respectively;
- selectively setting a zero pedal torque equal to the first minimum propulsion torque;
- determining a pedal torque request based on an accelerator pedal position, a vehicle speed, and the zero pedal torque;
- determining a driver axle torque request based on the pedal torque request;
- selectively shaping the driver axle torque request;
- determining a shaped driver axle torque request based on the driver axle torque request;
- converting the first minimum propulsion torque into a minimum axle torque; and
- setting a final driver axle torque request equal to a greater one of the shaped driver axle torque request and the minimum axle torque.

12. The engine control method of claim 11 further comprising controlling at least one engine actuator based on the final driver axle torque request.

13. The engine control method of claim 11 further comprising:
- determining a second zero pedal torque based on an engine speed and a position of a park, reverse, neutral, drive lever; and
- setting the zero pedal torque equal to the first minimum propulsion torque when the first minimum propulsion torque is greater than the second zero pedal torque.

14. The engine control method of claim 13 further comprising, when the second zero pedal torque is greater than the second minimum propulsion torque, setting the first minimum propulsion torque equal to a selected one of the second and third minimum propulsion torques when the torque converter clutch is in the unlocked state and the locked state, respectively.

15. The engine control method of claim 11 further comprising selectively ramping the first minimum propulsion torque to a selected one of the second and third minimum propulsion torques when the torque converter clutch is in the unlocked state and the locked state, respectively.

16. The engine control method of claim 15 further comprising ramping the first minimum propulsion torque to the selected one of the second and third minimum propulsion torques based on at least one of the shaped driver axle torque request and an unshaped driver axle torque request.

17. The engine control method of claim 15 further comprising:
- determining a ramp rate based on the selected one of the second and third minimum propulsion torques; and
- ramping the first minimum propulsion torque to the selected one of the second and third minimum propulsion torques at the ramp rate.

18. The engine control method of claim 17 further comprising:
- setting the ramp rate to a first ramp rate when the selected one of the second and third minimum propulsion torques is the second minimum propulsion torque; and
- setting the ramp rate to a second ramp rate when the selected one of the second and third minimum propulsion torques is the third minimum propulsion torque,
- wherein the first ramp rate is greater than the second ramp rate.

19. The engine control method of claim 11 further comprising:
- determining the second minimum propulsion torque based on an engine speed and a gear ratio selected with a transmission; and
- determining the third minimum propulsion torque based on the engine speed, the gear ratio, and a transmission oil temperature.

20. The engine control method of claim 19 further comprising:
- determining a fourth minimum propulsion torque based on the engine speed and the gear ratio; and
- setting the second minimum propulsion torque equal to a greater one of the fourth minimum propulsion torque and the third minimum propulsion torque.

* * * * *